Figure 7:
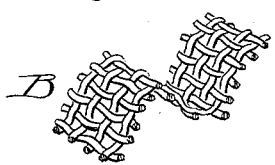

(No Model.) 3 Sheets—Sheet 1.
W. D. SARGENT.
BRAKE SHOE.
No. 587,493. Patented Aug. 3, 1897.
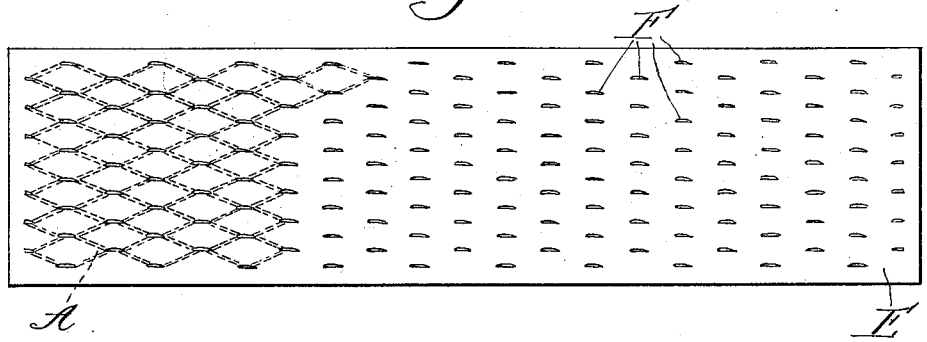
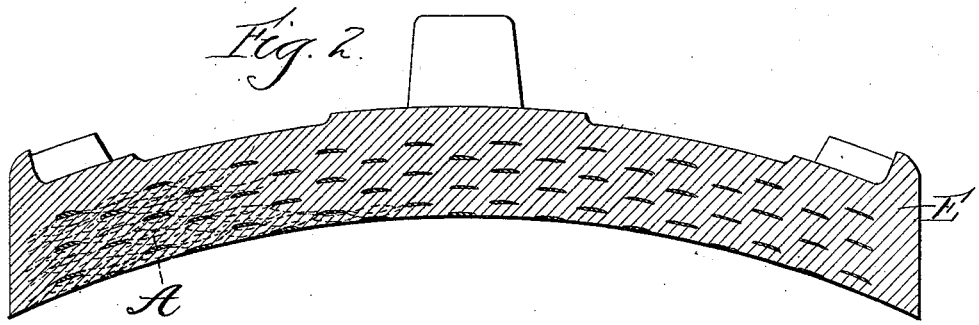
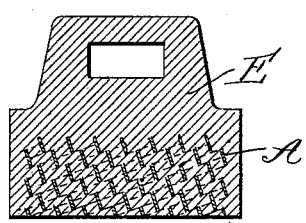
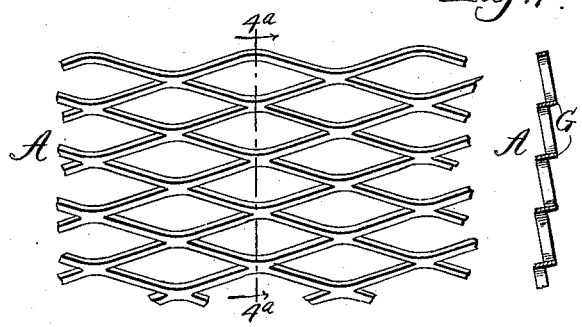
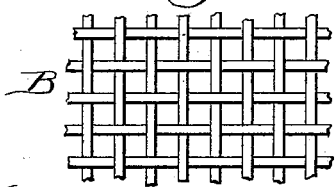
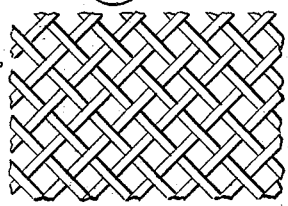
Witnesses
Wm. F. Henning
Wm. O. Belt
Inventor
William D. Sargent
by Raymond & Onshondo
Attys.

(No Model.) 3 Sheets—Sheet 2.

W. D. SARGENT.
BRAKE SHOE.

No. 587,493. Patented Aug. 3, 1897.

Witnesses
Inventor
William D. Sargent
By Raymond & Underwood
Attys.

(No Model.)                    W. D. SARGENT.                3 Sheets—Sheet 3.
                                BRAKE SHOE.
No. 587,493.                                        Patented Aug. 3, 1897.
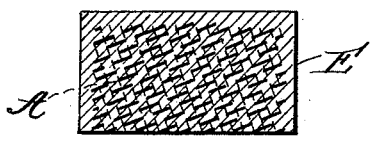
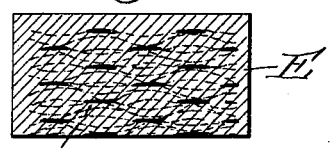
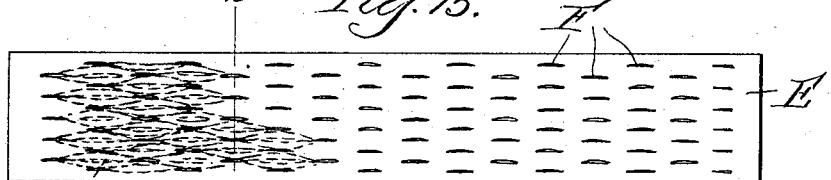
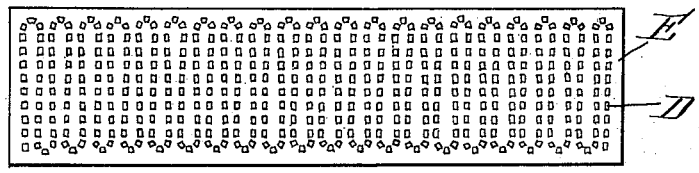
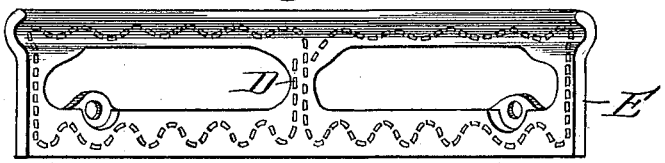
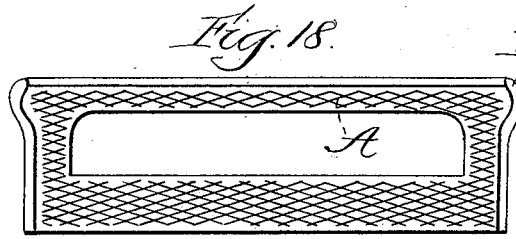
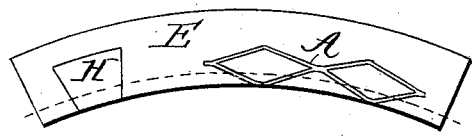

UNITED STATES PATENT OFFICE.

WILLIAM DURHAM SARGENT, OF CHICAGO, ILLINOIS, ASSIGNOR TO THE SARGENT COMPANY, OF SAME PLACE.

BRAKE-SHOE.

SPECIFICATION forming part of Letters Patent No. 587,493, dated August 3, 1897.

Application filed April 14, 1897. Serial No. 632,151. (No model.)

*To all whom it may concern:*

Be it known that I, WILLIAM DURHAM SARGENT, a citizen of the United States, residing at Chicago, in the county of Cook and State of Illinois, have invented certain new and useful Improvements in Brake-Shoes, of which the following is a full, clear, and exact description, reference being had to the accompanying drawings, forming a part of this specification.

My invention relates to improvements in brake-shoes of all kinds and as well to those which dress the wheel as to others which do not, the same being applicable to all conditions where a superior braking effect is important or desirable.

The primary object of this invention is to provide a brake-shoe combining superior braking qualities with great longevity and having a composite wearing-face whose component parts constantly change in area and position during wear of the shoe.

Another object of the invention is to promote the longevity of a cast-metal brake-shoe by combining therewith a metal which does not wear or disintegrate too rapidly in such manner that the latter metal is distributed in small parts throughout the area of the face of the shoe, whereby the wearing or operative face of the shoe is always of a composite and changing character; and a further object is to provide a cast-metal brake-shoe with an insert composed of a ductile metal having numerous interstices, whereby it is permeated by the cast metal, so as to provide a solid homogeneous body; and a further object is to provide a brake-shoe with an insert of such a character and arranged in such a position therein that the parts of the insert exposed on the wearing-face of the shoe will constantly change in area and position.

With these and other objects in view my invention consists in providing a brake-shoe with a foraminous ductile metal insert, and by "ductile" metal it will be understood that I mean any metal the form of which can be changed or altered without injury, such as malleable or wrought metal of any kind, whether such metal is hard or soft.

The objects of my invention may be accomplished in a variety of different ways and by a great many different kinds and forms of insert, and in the accompanying drawings I have shown some of the different embodiments of my invention, referring to which—

Figure 9:
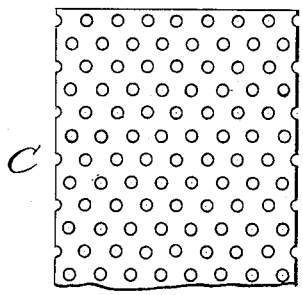
Figure 8:
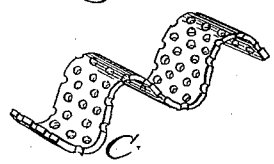
Figure 10:
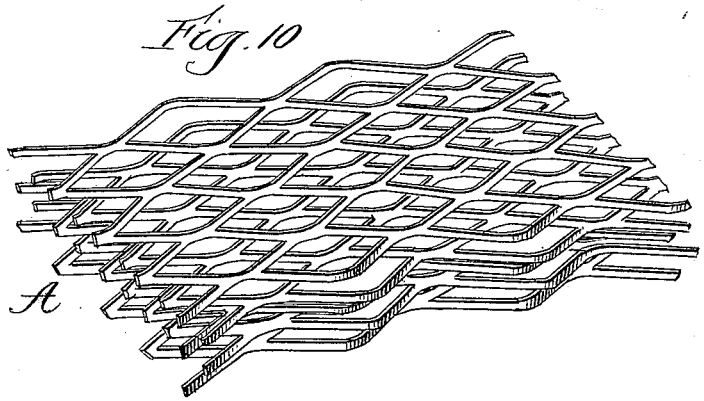
Figure 11:
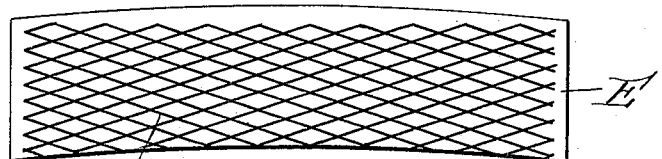
Figure 12:
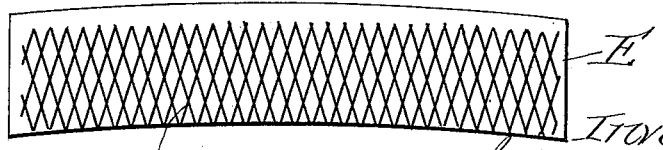

Figure 1 is a plan view of the wearing-face of a brake-shoe embodying my invention, the outline of the insert being shown on one part thereof in broken lines. Fig. 2 is a longitudinal sectional view of the brake-shoe shown in Fig. 1. Fig. 3 is a transverse sectional view of the brake-shoe shown in Fig. 1. Fig. 4 is a plan view of a section of expanded metal which makes a very desirable insert. Fig. $4^a$ is a sectional view on the line $4^a 4^a$ of Fig. 4. Figs. 5 and 6 illustrate different kinds of wire inserts. Fig. 7 shows a wire insert bent into a sinuous form. Fig. 8 shows a sinuous metal plate provided with a number of perforations. Fig. 9 shows a perforated plate. Fig. 10 illustrates a laminated pile of expanded-metal sections. Figs. 11 and 12 are diagrammatic side views of a brake-shoe, showing two different ways of arranging the insert therein. Fig. 13 is a cross-sectional view on the line 13 13 of Fig. 15. Fig. 14 is a cross-sectional view of a brake-shoe in which the insert is arranged with the meshes at right angles to the meshes of the insert in Fig. 1. Fig. 15 is a plan view of the wearing-face of a brake-shoe in which the sections forming the insert are arranged on edge. Fig. 16 is a plan view of the wearing-face of a brake-shoe having a sinuous perforated reinforcement therein. Fig. 17 is a similar view of a dressing brake-shoe having a sinuous reinforcement therein. Fig. 18 is also a plan view of the wearing-face of a wearing brake-shoe having a perforated reinforcement therein. Fig. 19 is a diagrammatic view showing the manner in which the area and position of my improved insert vary in comparison with the solid metal plugs heretofore employed.

Heretofore some cast-metal brake-shoes have been made which embody large wrought-metal inserts, but in actual practice it has been found that such inserts, whose area and position are substantially constant, are very liable to change in character by the operation of the wheel thereon and to such an extent that they have a dangerous and destructive action on the tread of the wheel by wearing the same unevenly. A steel brake-shoe has the longest life, but it is well known that its braking qualities diminish with age and use by reason of the fact that its wearing-face crystallizes and changes its character in parts, thereby wearing the wheel unevenly and causing much trouble. A cast-iron shoe has the best braking qualities by reason of its granular structure, but such a shoe wears out very rapidly for the same reason.

I have endeavored by this invention to produce a brake-shoe which embodies the superior braking qualities of a cast-iron shoe and the longevity of a steel shoe without any danger or liability of the shoe injuring the tread of the wheel.

Many other forms of inserts than those shown in the drawings may be employed to accomplish the objects of my invention, but I have shown some and different ways in which they may be arranged, which will indicate the wide scope of my invention.

Among the many different kinds of inserts which may be used I have found that one composed of sections of expanded metal A to be very desirable. These sections may be laminated in a pile, as shown in Fig. 10, and arranged in the shoe so that the flat surface thereof will form a part of the wearing-face of the shoe, as shown in Fig. 1, or these sections may be arranged on edge and side by side, so that the edges of the sections will form a part of the wearing-face of the shoe, as indicated in Figs. 12 and 15. In Fig. 11 it will be observed that the mesh of the expanded metal runs with the length of the shoe, while in Fig. 12 it runs across the shoe, and it will be understood that the insert can be arranged within the shoe in many other ways without departing from the spirit of my invention.

Instead of an insert composed of expanded metal I may use one composed of wire B, as shown in Figs. 5 and 6, or of metal plates C, provided with a number of perforations, as shown in Fig. 9, and these inserts may be laminated in the different ways heretofore described with relation to the expanded-metal insert, or they may be bent into a sinuous form, as shown in Figs. 7, 8, 16, and 17. There are also many different kinds of wire and perforated-plate inserts that may be used. The mesh of the wire inserts may be of different size and differently arranged, as described with reference to the expanded-metal insert, and the perforations in the plate C may be of different sizes and distributed in a different manner throughout the plates.

The dressing brake-shoe may be provided with an insert, as shown in Figs. 17 and 18. In Fig. 17 a perforated insert is shown, for example, arranged in a sinuous form on its edge, and in Fig. 18 an expanded-metal insert is arranged in a manner similar to that shown in Fig. 1. The inserts may be arranged in this style of shoe in as many different ways as in the ordinary shoe heretofore referred to, but when an insert is arranged as shown in Fig. 18, with its flat side forming a part of the wearing-face of the shoe, it will be unnecessary to provide a connection between the two sides of the shoe, as indicated by D in Fig. 17, although this connection may be employed, if desired.

I have shown and described my invention more particularly as embodying an insert composed of expanded metal, for the reason that this constitutes a simple, inexpensive, and desirable form of insert which can be readily worked into any form desired and which is also particularly adaptable to the objects of my invention. In laminating sections of this expanded metal they are arranged upon each other so as to break joints, as shown in Fig. 10, and in this way a continuous hole extending throughout the insert, of any regular size, is avoided. Instead of having the sections arranged in contact with each other, as indicated in Fig. 10, they may be located at a more or less distance from each other, and such a construction may be found desirable more particularly when the sections are arranged on edge in the manner indicated in side views in Figs. 11 and 12, or this expanded metal may be bent into a sinuous form, as shown in Figs. 7 and 8, and arranged in the shoe, as shown in Fig. 16, or in other ways which will occur to those skilled in the art. The same arrangement may be employed with other kinds of inserts.

In making a brake-shoe in accordance with my invention the insert, having been properly shaped and prepared, is supported in a mold, and then the metal of which the shoe proper is made, such as cast metal, is poured into the mold. The cast metal will permeate the insert in different directions and fill the interstices thereof, so as to form a solid homogeneous body, the insert and shoe proper being permanently bound together in an inseparable manner. I prefer to make the body proper of the shoe (indicated by E) of cast metal, because of its superior braking qualities, while the insert, as before stated, is composed of a ductile metal which coacts with the cast metal to provide a shoe having all the braking qualities of a cast-metal shoe and the longevity of a steel shoe.

By reason of the peculiar character of expanded metal and the inclination of its component parts, as indicated in Figs. 4 and 4$^a$, it has been found that an insert composed thereof will be distributed throughout the body of the shoe in such a manner that the wearing-face of the shoe will always be of a finely-divided and composite character, the parts of which are constantly changing in area and position as the wearing-face is worn in use. In Fig. 1 I have shown how the wearing-face of the shoe may look before it has been used, in which parts F of the insert project through the wearing-face of the shoe at intervals. These projections of course are those parts of the expanded metal which project most above the central plane thereof, as edges G in Fig. 4ª, and as these edges wear down with the face of the shoe the proportion of the insert which becomes exposed gradually increases and spreads out and of course the cast metal of the shoe proper exposed correspondingly decreases in area and position. This changing of area and position of the component parts of the wearing-face of the shoe is illustrated in Fig. 19, which shows the brake-shoe before it has been used in full lines. The dotted line indicates the wearing-face of the shoe after it has been in use and shows that the area and position of the exposed parts of the insert will have changed and that the position and area of the cast-metal shoe proper will have correspondingly changed. This is of great importance in its effect upon the tread of the wheel, for as the position and area of the component parts of the wearing-face of the shoe are constantly changing the exposed parts of the insert and the cast metal will engage different parts of the tread of the wheel instead of operating against the same parts of the tread, thereby dressing and wearing the tread of the wheel evenly and uniformly without wearing it in grooves or more in parts than in others, as would likely be the case if the same area of the insert engaged the same part of the tread continually.

The wrought-metal inserts, which have heretofore been used to some extent, are of the character substantially indicated by H in Fig. 19, and being of a slightly wedge-shaped form their area changes in a very slight degree, but these inserts are of such size and their area and position are to all intents and purposes so absolutely constant that they have been found to change in character after being used to some extent until they have a destructive effect on the tread of the wheel. When the shoe is held in contact with the wheel, these inserts H become heated to a very high degree, and being instantly chilled when the brake is loosened and the shoe is released from contact with the wheel the exposed face of the insert is crystallized, and these crystals dropping off leave the face of the insert irregular and of such a character that it will injure, to a more or less extent, the tread of the shoe. The perforated-metal insert herein described, however, overcomes this radical defect in the inserts H, because the metal forming the insert is finely distributed throughout the area of the shoe, whereby the wearing-face of the shoe consists of the face of the cast-metal shoe proper with numerous small parts of the insert distributed throughout the same.

A brake-shoe made in accordance with my invention as herein described will possess superior qualities both as to its braking effect and its longevity, and it will have a composite wearing-face in which the ductile-metal insert is finely divided and substantially uniformly distributed in very small parts. As the shoe wears the proportions of the two metals forming the wearing-face of the shoe remain substantially constant, but the disposition and the area of the ductile metal with relation to the cast metal constantly change, as hereinbefore described. In this respect my invention is differentiated from those brake-shoes having wrought-metal inserts, such as H, and also from that type of brake-shoes having rods extending transversely through the shoe, such shoes not having a "finely-divided" insert and a "constantly-changing" wearing-face in the sense that those terms are used with relation to my invention.

I obtain the desirable results before mentioned by having one of the metals of which the shoe is composed distributed throughout the body of the shoe in differing planes.

Figs. 1 and 15 show the position of these exposed parts of the insert on the face of the shoe, and Figs. 3, 13, and 14 also show in cross-sectional views how the insert is distributed through the shoe.

When the brake-shoe is made, it may be found more convenient to arrange the insert within the shoe in such a manner that it will not be exposed at all on the wearing-face of the shoe, a thin continuous surface of cast metal forming temporarily the wearing-face of the shoe, but if this method is followed the continuous face of cast metal will quickly wear off in use and the small parts of the insert come into operative position.

Having thus fully described my invention, what I claim, and desire to secure by Letters Patent, is—

1. A brake-shoe composed partly of metal having superior braking qualities, such as cast metal, and partly of ductile metal possessing great longevity, the ductile metal being distributed throughout the body of the shoe in differing planes to provide a wearing-face for the shoe of a finely-divided and composite character.

2. A brake-shoe composed of two different kinds of metal disposed in differing planes and so combined as to provide a wearing-face for the shoe of a finely-divided and composite character and which is constantly changing, whereby the relative disposition of the two metals on the wearing-face constantly changes as the shoe wears.

3. A brake-shoe composed of two different kinds of metal, one of which is disposed in differing planes and constantly changes in position on the wearing-face of the shoe, said metals being so combined as to provide a wearing-face for the shoe of a finely-divided and composite character.

4. A brake-shoe composed of two different kinds of metal, one of which is disposed in differing planes and constantly changes in area on its wearing-face, said metals being so combined as to provide a wearing-face for the shoe of a finely-divided and composite character.

5. A brake-shoe composed of two different kinds of metal, one of which is disposed in differing planes and constantly changes in area and position on its wearing-face, to provide a wearing-face of a finely-divided and composite character.

6. A cast-metal brake-shoe, having an insert consisting of a foraminous ductile metal body, and constituting a part of the wearing-face of the shoe.

7. A cast-metal brake-shoe, having a foraminous ductile metal insert, constituting a part of the wearing-face of the shoe, said insert being permeated in different directions by the cast metal so as to form a solid homogeneous mass.

8. A cast-metal brake-shoe, having an insert composed of a number of foraminous sections of ductile metal.

9. A cast-metal brake-shoe, having an insert composed of a laminated pile of foraminous sections of ductile metal.

10. A cast-metal brake-shoe, having an insert composed of expanded metal.

11. A cast-metal brake-shoe, having an insert composed of a laminated pile of sections of expanded metal.

12. A cast-metal brake-shoe, having an insert composed of a laminated pile of foraminous sections, said sections being arranged with relation to each other so that the holes therein will not register.

WILLIAM DURHAM SARGENT.

Witnesses:
  WM. O. BELT,
  C. L. WOOD.